(12) United States Patent  
Patel et al.

(10) Patent No.: US 8,269,393 B2
(45) Date of Patent: Sep. 18, 2012

(54) CROWNED END WINDING SUPPORT FOR MAIN WOUND FIELD OF A GENERATOR

(75) Inventors: Dhaval Patel, Rockford, IL (US); Alan D. Hanson, Winnebago, IL (US); Glenn W. Hufstedler, Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 519 days.

(21) Appl. No.: 12/487,023

(22) Filed: Jun. 18, 2009

(65) Prior Publication Data

US 2010/0320860 A1 Dec. 23, 2010

(51) Int. Cl.
*H02K 1/00* (2006.01)

(52) U.S. Cl. .................................................. 310/194

(58) Field of Classification Search .............. 310/270, 310/194, 214, 215
See application file for complete search history.

(56) References Cited

U.S. PATENT DOCUMENTS

| | | |
|---|---|---|
| 3,977,621 A | 8/1976 | Huffman |
| 4,361,387 A | 11/1982 | Cloutier |
| 4,646,985 A | 3/1987 | Goyau et al. |
| 5,005,123 A | 4/1991 | Mierzwinski |
| 5,114,770 A | 5/1992 | Echizen et al. |
| 5,279,700 A | 1/1994 | Retti |
| 5,527,391 A | 6/1996 | Echizen et al. |
| 5,660,961 A | 8/1997 | Yu |
| 5,814,005 A | 9/1998 | Barra et al. |
| 5,843,088 A | 12/1998 | Barra et al. |
| 5,857,294 A | 1/1999 | Castro |
| 6,011,377 A | 1/2000 | Heglund et al. |
| 6,037,752 A | 3/2000 | Glennon |
| 6,064,121 A | 5/2000 | Shervington et al. |
| 6,091,168 A | 7/2000 | Halsey et al. |
| 6,124,649 A | 9/2000 | Schafroth |
| 6,155,726 A | 12/2000 | Ishikawa et al. |
| 6,181,112 B1 | 1/2001 | Latos et al. |
| 6,183,933 B1 | 2/2001 | Ishikawa et al. |
| 6,199,519 B1 | 3/2001 | Van Blarigan |
| 6,241,004 B1 | 6/2001 | Ebisu et al. |
| 6,281,678 B1 | 8/2001 | Auville |
| 6,316,714 B1 | 11/2001 | Kotanagi et al. |
| 6,329,465 B1 | 12/2001 | Takahashi et al. |
| 6,359,412 B1 | 3/2002 | Heglund |
| 6,359,841 B1 | 3/2002 | Kotanagi et al. |
| 6,407,965 B1 | 6/2002 | Matoge et al. |
| 6,442,210 B1 | 8/2002 | Pennell |
| 6,462,429 B1 | 10/2002 | Dhyanchand et al. |
| 6,465,928 B1 | 10/2002 | Shervington et al. |
| 6,470,933 B1 | 10/2002 | Volpi |
| 6,508,299 B2 | 1/2003 | Ebisu et al. |
| 6,530,418 B2 | 3/2003 | Ebisu et al. |
| 6,546,982 B1 | 4/2003 | Brown et al. |
| 6,667,140 B2 | 12/2003 | Tosaka et al. |
| 6,707,205 B2 | 3/2004 | Johnsen |
| 6,727,609 B2 | 4/2004 | Johnsen |
| 6,836,086 B1 | 12/2004 | Goldberg et al. |
| 6,849,987 B2 * | 2/2005 | Tornquist et al. ............. 310/270 |
| 6,861,626 B2 | 3/2005 | Ogasawara et al. |
| 6,885,111 B2 | 4/2005 | Volpi |

(Continued)

*Primary Examiner* — Nguyen N Hanh
(74) *Attorney, Agent, or Firm* — Carlson, Gaskey & Olds PC

(57) ABSTRACT

An end turn support for a generator includes a wire support. The wire support extends along an axis in a radial direction from an axis of rotation. The wire support defines an arcuate wire receipt surface.

20 Claims, 7 Drawing Sheets

U.S. PATENT DOCUMENTS

| | | |
|---|---|---|
| 6,885,291 B1 | 4/2005 | Pollack et al. |
| 6,899,153 B1 | 5/2005 | Pollack et al. |
| 6,967,461 B1 | 11/2005 | Markunas et al. |
| 6,973,010 B1 | 12/2005 | Koike et al. |
| 6,982,506 B1 | 1/2006 | Johnsen |
| 7,072,790 B2 | 7/2006 | Hu et al. |
| 7,084,782 B2 | 8/2006 | Davies et al. |
| 7,105,282 B2 | 9/2006 | Yamane et al. |
| 7,200,917 B2 * | 4/2007 | Takano et al. ............... 29/596 |
| 7,205,016 B2 | 4/2007 | Garwood |
| 7,208,854 B1 | 4/2007 | Saban et al. |
| 7,216,600 B1 | 5/2007 | Hamilton et al. |
| 7,224,147 B2 | 5/2007 | Shah et al. |
| 7,242,105 B2 | 7/2007 | Mehl et al. |
| 7,262,537 B2 | 8/2007 | Worley et al. |
| 7,267,933 B2 | 9/2007 | Oyamada et al. |
| 7,268,522 B1 | 9/2007 | Baker |
| 7,291,955 B2 * | 11/2007 | Otsuji ........................... 310/194 |
| 7,385,332 B2 | 6/2008 | Himmelmann |
| 7,400,117 B1 | 7/2008 | Rozman et al. |
| 7,408,327 B2 | 8/2008 | Shah et al. |
| 7,415,428 B2 | 8/2008 | Garwood |
| 7,439,715 B2 | 10/2008 | Rozman et al. |
| 7,442,009 B2 | 10/2008 | Arel |
| 7,501,799 B2 | 3/2009 | Rozman et al. |
| 7,510,065 B2 | 3/2009 | Taylor et al. |
| 7,511,392 B2 | 3/2009 | Rubbo et al. |
| 7,521,906 B2 | 4/2009 | Rozman et al. |
| 7,595,572 B2 * | 9/2009 | Haga et al. ..................... 310/71 |
| 7,732,968 B2 * | 6/2010 | Zimmer et al. ............... 310/194 |

* cited by examiner

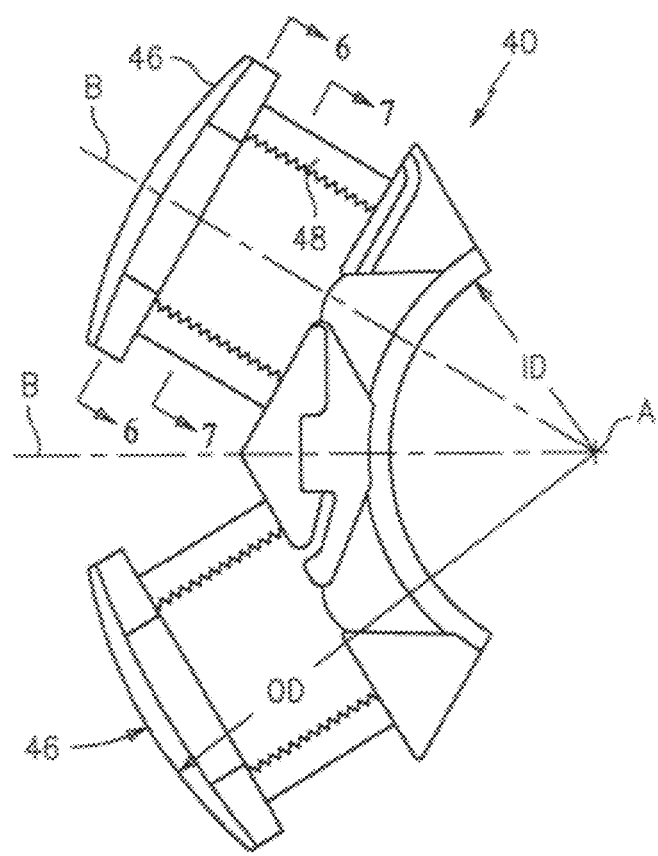
FIG. 4
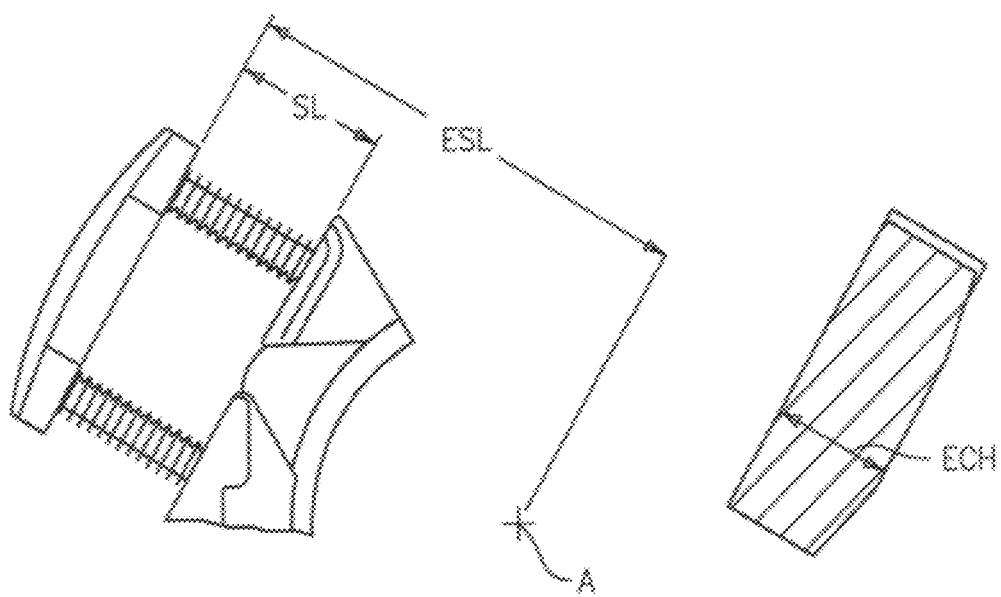
FIG. 5
FIG. 6

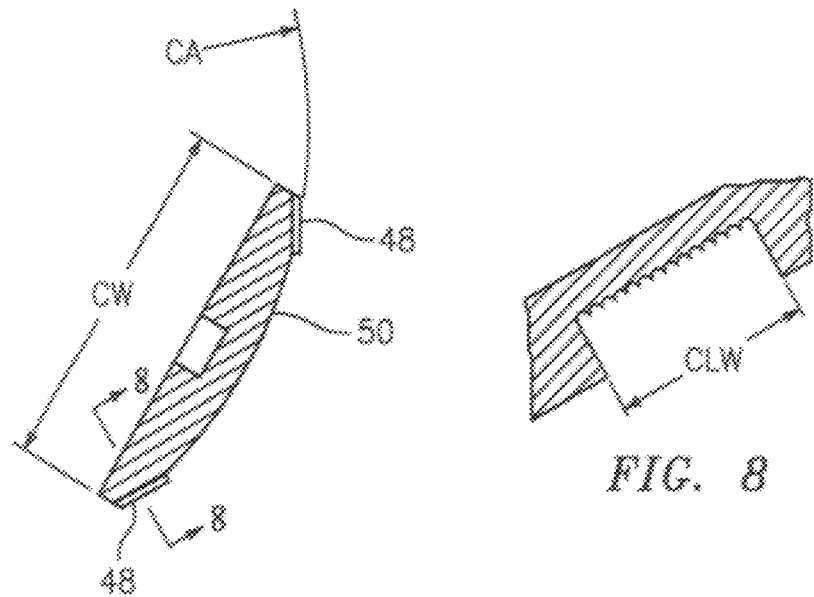
FIG. 7
FIG. 8
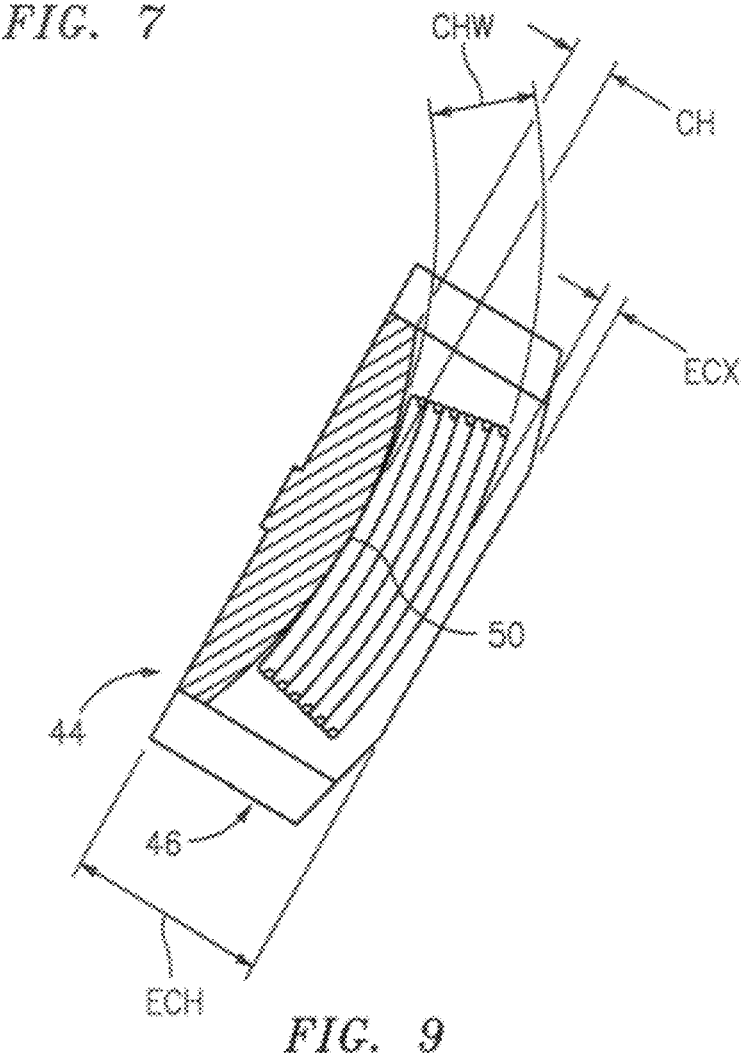
FIG. 9

CROWNED END WINDING SUPPORT FOR MAIN WOUND FIELD OF A GENERATOR

BACKGROUND

The present disclosure relates to a generator, and more particularly to a main rotor thereof.

Aircraft powered by gas turbine engines often include a mechanically driven accessory gearbox which connects to accessory systems such as an electrical starter-generator or electric generator. Integrated Drive Generator (IDG), Variable Frequency Generator (VFG) and Variable Frequency Starter Generator (VFSG), and other such systems incorporate a main rotor having a main field winding wound around a rotor core. On some generators, the wires in the main field winding may move during operation.

SUMMARY

An end turn support for a generator according to an exemplary aspect of the present disclosure includes a wire support. The wire support extends along an axis in a radial direction from an axis of rotation. The wire support defines an arcuate wire receipt surface.

A rotor for a generator according to an exemplary aspect of the present disclosure includes a main field winding. A shaft which defines an axis of rotation and an end turn support mounted to the main field rotor core to support the main field winding. The end turn support includes a wire support which extends along an axis in a radial direction from the axis of rotation, the wire support defines an arcuate wire receipt surface to receive at least one wire of the main field winding.

A generator according to an exemplary aspect of the present disclosure includes a shaft which defines an axis of rotation. A first end turn support mounted to the main field rotor core, the first end turn support includes at least one first wire support which extends along an axis in a radial direction from the axis of rotation, each of the at least one first wire supports defines a first arcuate wire receipt surface. A second end turn support mounted to the main field rotor core, the second end turn support includes at least one second wire support which extend along an axis in a radial direction from the axis of rotation, each of the at least one second wire supports defines a second arcuate wire receipt surface. A main field winding which includes at least one wire which is wound around the first arcuate wire receipt surface and the second arcuate wire receipt surface.

A method of forming a rotor for a generator according to an exemplary aspect of the present disclosure includes mounting an end turn support to a main field rotor core, which defines an axis of rotation. Winding a main field winding at least partially around a wire support of the end turn support such that at least one wire of the main field winding is supported on an arcuate wire receipt surface of said end turn support.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 4 is a face view of the end support;

FIG. 5 is an expanded view of one wire support of the end support;

FIG. 6 is a sectional view taken along line 6-6 in FIG. 4;

FIG. 7 is a sectional view taken along line 7-7 in FIG. 4;

FIG. 8 is a sectional view taken along line 8-8 in FIG. 7; and

FIG. 9 is the sectional view of FIG. 7 schematically illustrating a six wire non-nested stack embodiment of the main field winding wound onto the wire support of the end support.

DETAILED DESCRIPTION

Figure 1:
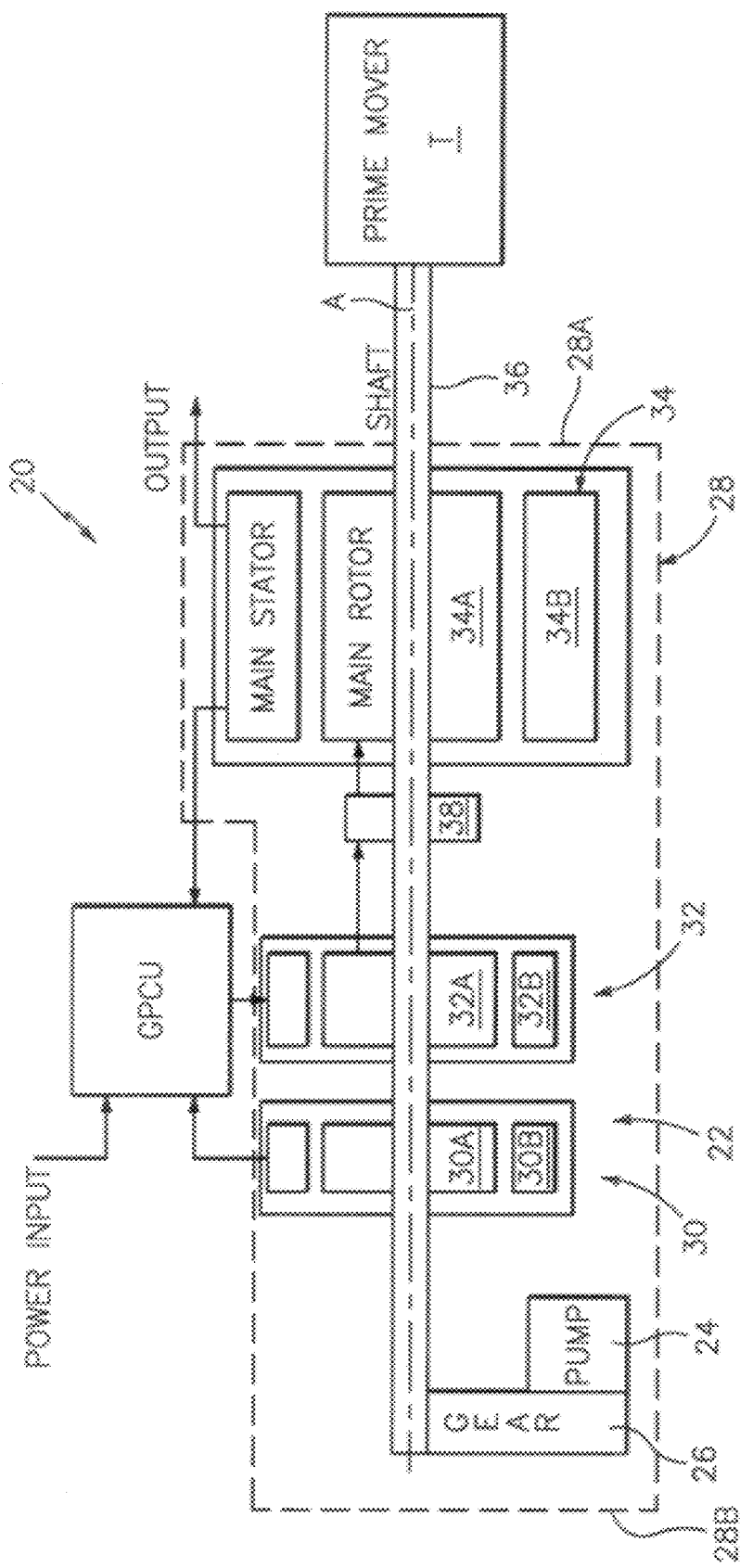
FIG. 1 is a general schematic sectional view of a starter-generator for a gas turbine engine.

FIG. 1 schematically illustrates selected portions of an example generator 20 driven by a prime mover T such as a gas turbine engine and for generating electrical current when being driven by the prime mover T. The generator 20 may generally include a dynamoelectric portion 22, a positive displacement pump 24 and a gearbox 26 all contained within a common housing assembly 28. Although a variable frequency starter generator (VFSG) is illustrated in the disclosed embodiment, it should be understood that other generator systems such as a VFG or IDG will also benefit herefrom. These types of generators may be particularly well suited for aircraft applications.

The dynamoelectric portion 22 in the disclosed, non-limiting embodiment is a 3-phase machine that includes three machines 30, 32 and 34 mounted along a rotor shaft 36 along an axis of rotation A. Stator assemblies 30B, 32B, 34B of the three machines are installed in the housing assembly 28 and the three rotor assemblies 30A, 32A, 34A are installed on the rotor shaft 36. The housing assembly 28 may be closed with a drive end (DE) cover assembly 28A through which the rotor shaft 36 extends and a non-drive end (NDE) cover assembly 28B.

The first machine 30 includes a permanent magnet generator (PMG) with a PMG rotor assembly 30A and a stator assembly 30B. The PMG stator assembly 30B supplies power for generator excitation, as well as power for other components of the electrical system. The second machine 32 includes a Main Exciter (ME) with a ME rotor assembly 32A and a stator assembly 32B. The ME receives field excitation from the PMG through a GPCU (Generator Power Control Unit). The output of the ME rotor assembly 32A is supplied to a rotor mounted diode pack 38. The diode pack 38 may be divided into six diodes to provide a 3-phase full wave bridge rectification. The DC output of the diode pack 38 supplies the third machine 34.

Figure 2A:
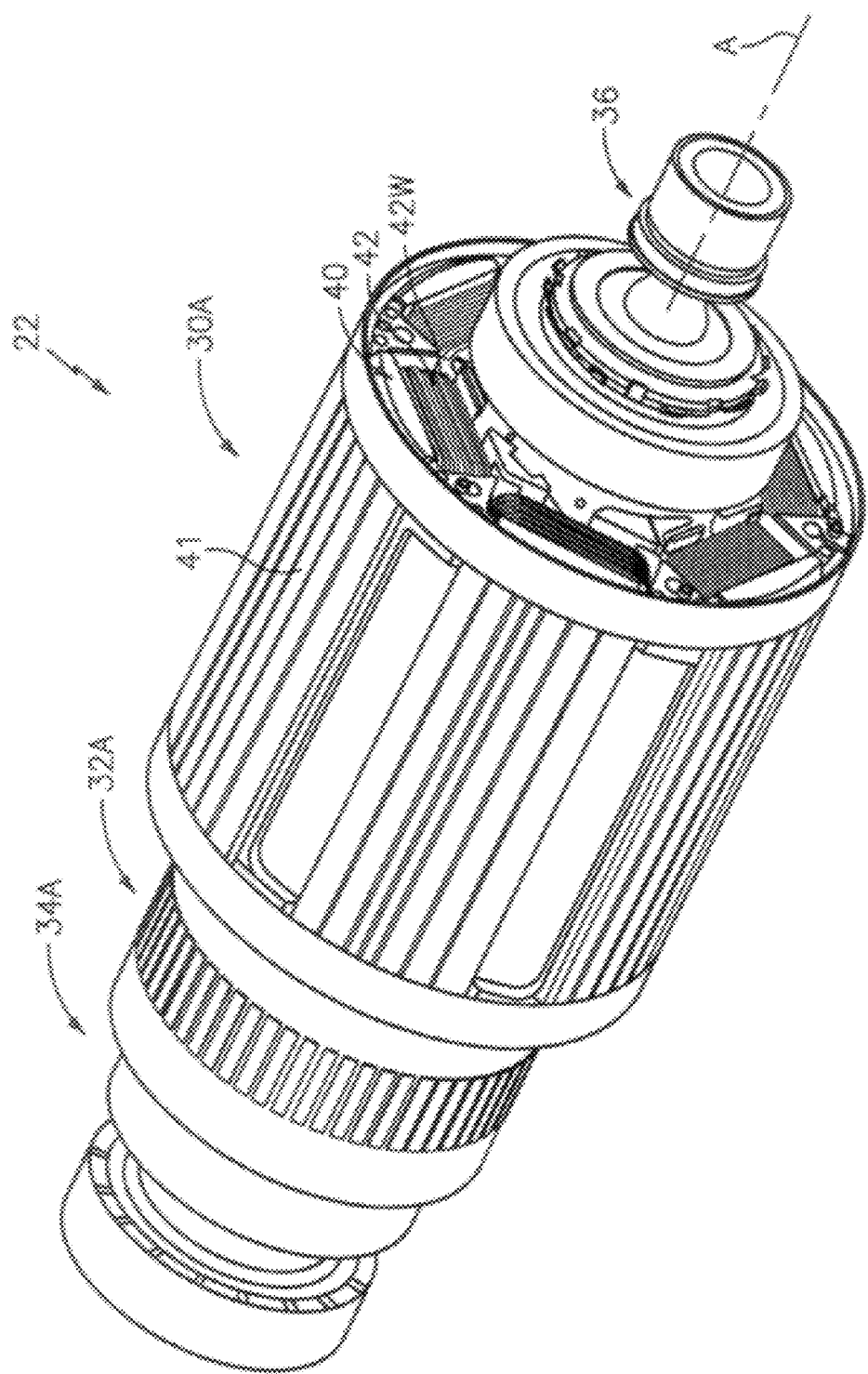
FIG. 2A is a perspective view of a rotor assembly.
Figure 2D:
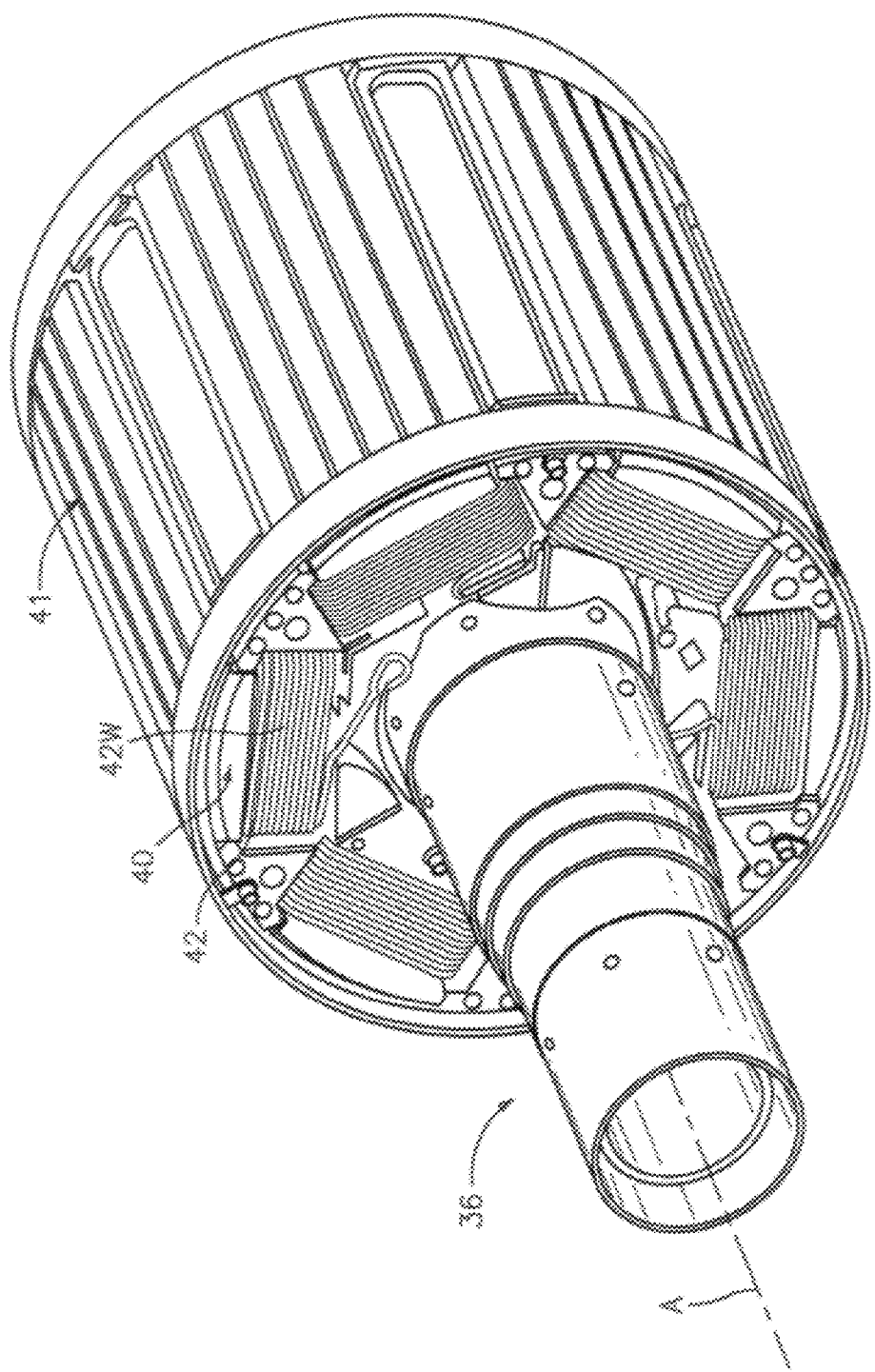
FIG. 2B is a perspective view of the main field mounted on the rotor shaft.
FIG. 2C is another perspective view of a main rotor field core of the rotor assembly.
Figure 2C:
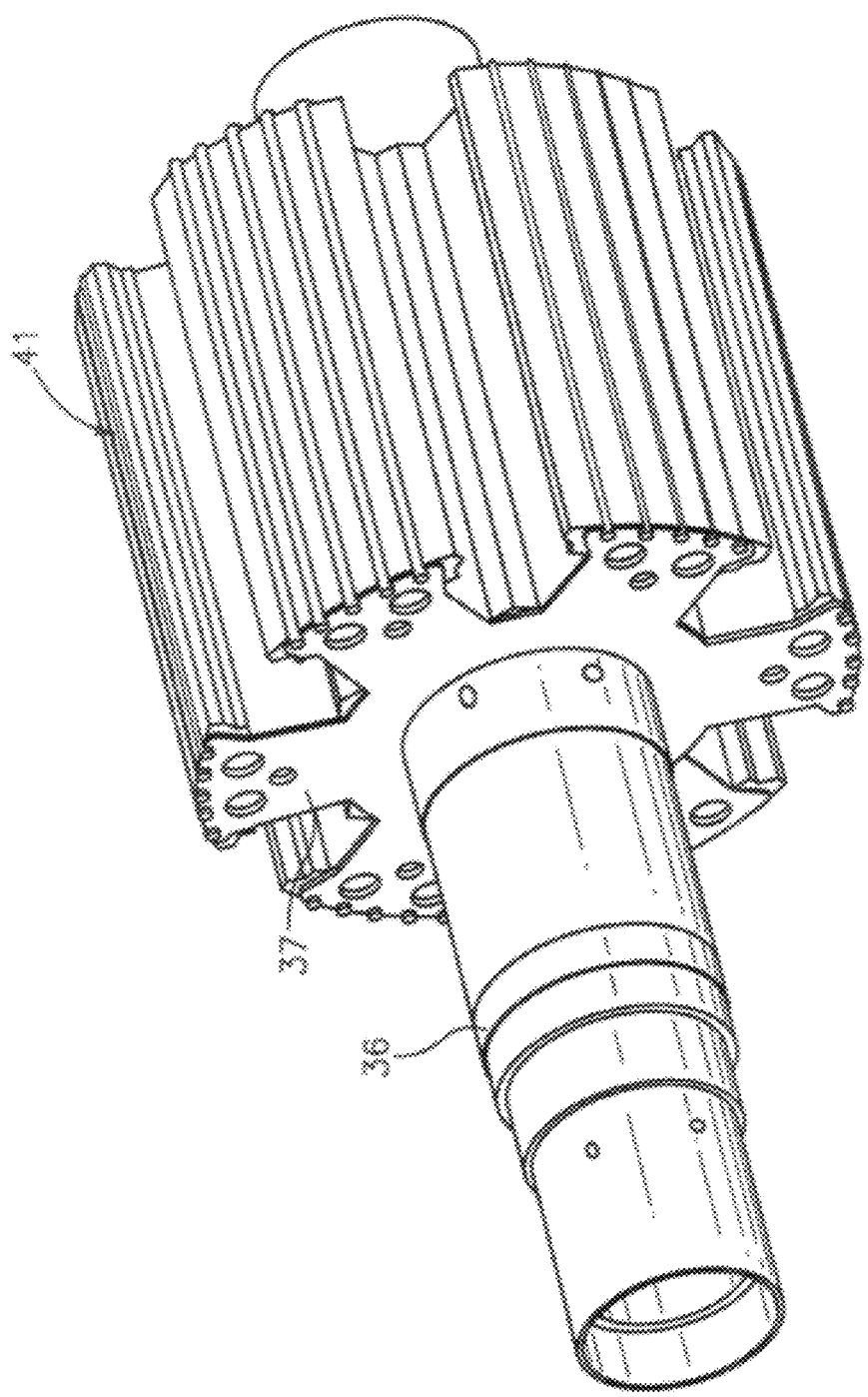
Figure 3:
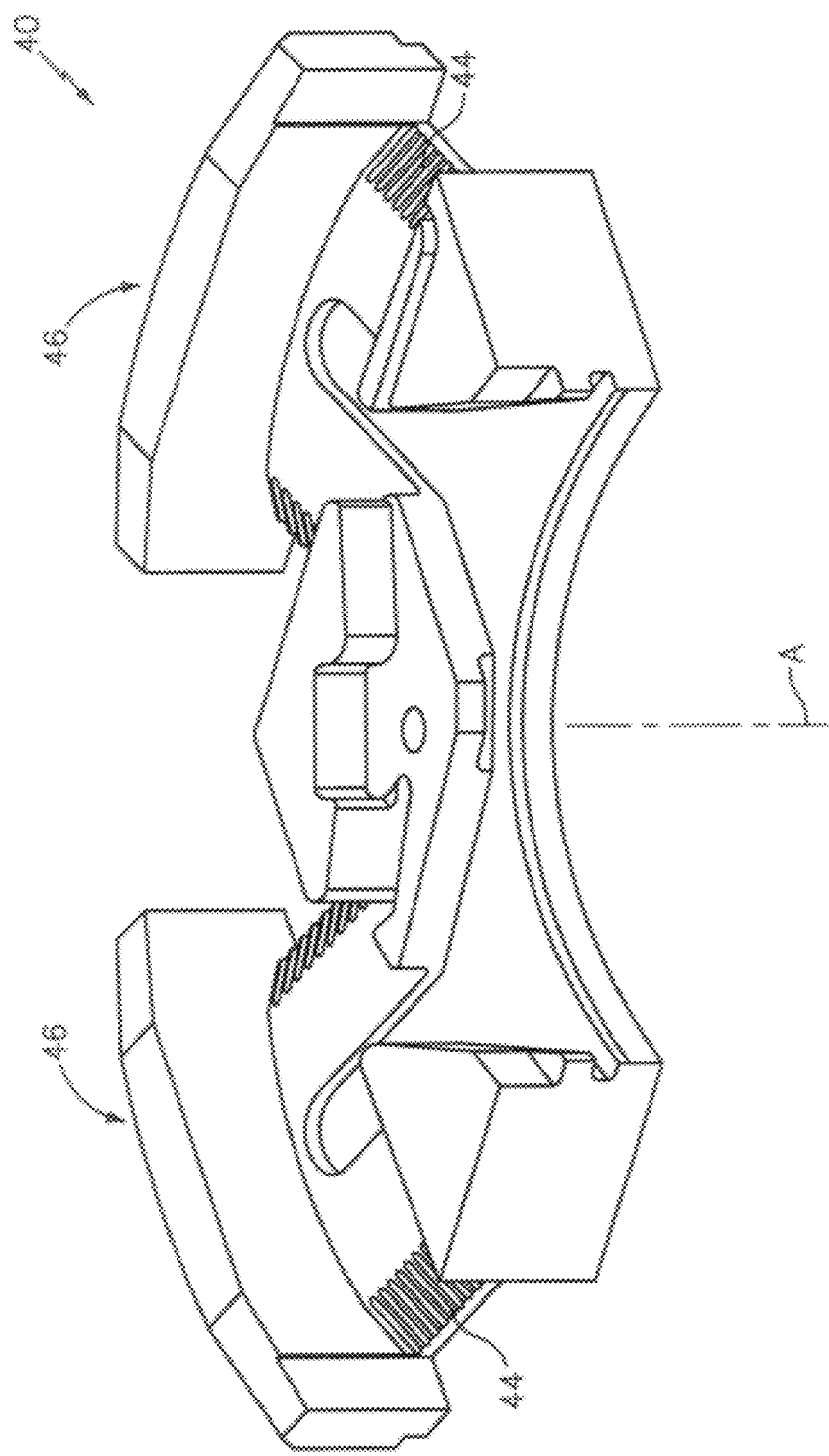
FIG. 3 is a perspective view of an end support.

Referring to FIG. 2A, the main wound field rotor assembly 30A of the dynamoelectric portion 22 generally includes a multiple of end turn supports 40 (also illustrated in FIGS. 2B and 3) mounted adjacent to a main field rotor core 41 (FIG. 2C) for rotation with the rotor shaft 36. Each of the end turn supports 40 define a multiple of wire supports 44 that support a respective portion of the main field winding 42 formed from at least one wire 42W wound about the main field rotor core 41 and the end turn supports 40. Each end turn support 40 is mounted adjacent to an axial end plate 37 which at least partially supports the main field rotor core 41. In the disclosed, non-limiting embodiment, three end turn supports 40 are utilized, each with two wire supports 44 to provide a 6 pole rotor core. Whereas each of the multiple of end turn supports 40 are the same, only a single end turn support 40 will be described in detail herein. The end turn support 40 may be manufactured of a high strength thermoplastic such as Torlon, a polyamide-imide (PAI), or Vespel, a polyimide.

Referring to FIG. 4, the end turn support 40 defines an inner diameter ID and an outer diameter OD relative the axis of rotation A. In one non-limiting dimensional embodiment, dimension ID is approximately 1.3 inches (33.0 mm) and dimension OD is approximately 3.3 inches (83.8 mm). A particular ratio of the OD dimension to the ID dimension is between 2.3:1 and 2.7:1.

The wire supports 44 extend along an axis B in a radial direction from the axis of rotation A. Each wire support 44 defines a length dimension SL referenced to an end turn support length ESL which extends in a radial direction from the axis of rotation A (FIG. 5). In one non-limiting dimensional embodiment, dimension SL is approximately 0.9 inches (22.9 mm) and dimension ESL is approximately 2.9 inches (73.7 mm). A particular ratio of the SL dimension to the ESL dimension is between 0.2:1-0.4:1.

An end cap 46 defines an end section of each wire support 44. The end cap 46 extends in an axial direction along the axis of rotation A so as to be relatively wider than the wire support 44 (also illustrated in FIG. 3). The end cap 46 defines a width dimension ECh (FIG. 6). In one non-limiting dimensional embodiment, dimension ECh is approximately 0.75 inches (19.1 mm).

Referring to FIG. 7, each wire support 44 includes an arcuate wire receipt surface 50 or crown about which a portion of the respective main field winding 42 is wound. The arcuate wire receipt surface 50 defines an arcuate dimension CA and a width CW. In one non-limiting dimensional embodiment, dimension CA is approximately R 2.5 inches (63.5 mm) and dimension CW is approximately 1.6 inches (40.6 mm).

Each wire support 44 includes a multiple of scallops 48 to receive a respective wire of the main field winding 42. The multiple of scallops 48 defines a length dimension CLw, which in one non-limiting dimensional embodiment is approximately 0.92 inches (23.4 mm). In one non-limiting embodiment, fourteen scallops 48 are provided (FIG. 8).

The primary area of wire 42W movement was determined by Applicant to be at the end turns of the main field winding 42 as radial loads are significantly increased due, in part, to the relatively large diameter and high speed operation. Conventional end turn supports are flat where the wires rest upon the end turns. Because the end turn supports are flat, the wires may be pulled across relatively tightly and strung like a bow to minimize movement, however, the wires may then not be supported in the middle of the flat end turn support.

Referring to FIG. 9, the arcuate wire receipt surface 50 defines a crown height dimension CH. The crown height dimension CH may be defined as approximately two wire diameters, which in one non-limiting dimensional embodiment, is approximately 0.132 inches (3.4 mm). The arcuate wire receipt surface 50 evenly supports the wires across the entire span of the wire support 44. This removes the heretofore bow string effect and supports the wires under high loads as well as reduce wire movement the resultant possibility of fatigue failures.

In one non-limiting embodiment, a six wire non-nested stack dimension CHw located upon the arcuate wire receipt surface 50 is approximately 0.396 inches (10.1 mm) with an end cap extension dimension ECX which extends from the top of the six wire non-nested stack toward the top of the end cap 46. In one non-limiting dimensional embodiment, dimension ECX is approximately 0.07 inches (1.8 mm). A particular ratio of dimension CH to dimension ECH is between 5.5:1-6:1. That is, dimension ECH is 5.5 to 6 times dimension EC. Such a ratio facilitates effective supports the higher radial loads of the larger diameter end turn support 40.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An end turn support for a generator rotor comprising:
    a rotor wire support which extends along an axis in a radial direction from an axis of rotation, said wire support defines an arcuate wire receipt surface having an arcuate span extending from a first circumferential end of said rotor wire support to a second, opposite circumferential end of said rotor wire support; and
    a main field winding which includes at least one wire which is wound around said arcuate wire receipt surface and a second arcuate wire receipt surface.

2. The end turn support as recited in claim 1, wherein said arcuate wire receipt surface defines a crown height dimension CH that is approximately two wire diameters.

3. The end turn support as recited in claim 2, wherein said end turn support defines a length dimension SL referenced to an end turn support length ESL from said axis of rotation to define ratio of the SL dimension to the ESL dimension between 0.2:1-0.4:1.

4. The end turn support as recited in claim 3, wherein said end turn support defines a multiple of scallops.

5. The end turn support as recited in claim 1, further comprising an end cap which defines an end section of said wire support, said end cap extends in an axial direction along said axis of rotation, said end cap wider along said axis of rotation relative to said wire support, wherein a radial distance between said end cap and said axis is fixed.

6. The end turn support as recited in claim 1, wherein said arcuate wire receipt surface is configured to evenly support across said entire arcuate span.

7. The end turn support as recited in claim 1, wherein said arcuate wire receipt surface has a consistent radius from the axis across said entire arcuate span.

8. The end turn support as recited in claim 1, wherein said end turn support provides a plurality of scallops that each hold a wire.

9. A rotor for a generator comprising:
    a main field winding;
    a shaft which defines an axis of rotation; and
    an end turn support mounted to said main field rotor core to at least partially support said main field winding, said end turn support includes a wire support which extends along an axis in a radial direction from said axis of rotation, said wire support defines an arcuate wire receipt surface to receive at least one wire of said main field winding, said arcuate wire receipt surface having a continuous arcuate span extending from a first circumferential end of said rotor wire support to a second, opposite circumferential end of said rotor wire support, wherein said at least one wire is wound around said arcuate wire receipt surface and a second arcuate wire receipt surface.

10. The rotor as recited in claim 9, wherein said end turn support further comprises an end cap which defines an end section of said wire support.

11. The rotor as recited in claim 9, wherein said end turn support defines a 120 degree arc.

12. The rotor as recited in claim 9, wherein said arcuate wire receipt surface is curved along said entire arcuate span.

13. A generator comprising:
a shaft which defines an axis of rotation; and
a first end turn support mounted to said main field rotor core, said first end turn support includes at least one first wire support which extends along an axis in a radial direction from said axis of rotation, each of said at least one first wire supports defines a first arcuate wire receipt surface;
a second end turn support mounted to said main field rotor core, said second end turn support includes at least one second wire support which extends along an axis in a radial direction from said axis of rotation, each of said at least one second wire supports defines a second arcuate wire receipt surface; and
a main field winding which includes at least one wire which is wound around said first arcuate wire receipt surface and said second arcuate wire receipt surface, wherein said first and second arcuate wire receipt surfaces are configured to evenly support said at least one wire across an entire span of said first arcuate wire receipt surface and across an entire span of said second arcuate wire receipt surface.

14. The generator as recited in claim 13, wherein said first arcuate wire receipt surface is directed toward a first end section of said shaft and said second arcuate wire receipt surface is oppositely directed toward a second end section of said shaft.

15. The generator as recited in claim 13, wherein said first and second arcuate wire receipt surface each define a crown height dimension CH, said crown height dimension CH approximately two wire diameters.

16. The generator as recited in claim 13, wherein said first end turn support includes six first wire supports and said second end turn support includes six second wire supports.

17. A method of forming a rotor for a generator comprising:
mounting an end turn support to a main field rotor core which defines an axis of rotation; and winding a main field winding at least partially around a wire support of the end turn support such that at least one wire of the main field winding is supported evenly on an arcuate wire receipt surface of said end turn support, said arcuate wire receipt surface extending from a first circumferential end of said wire support to an opposite, second circumferential end of said wire support, wherein said at least one wire is wound around said arcuate wire receipt surface and a second arcuate wire receipt surface.

18. A method as recited in claim 17, further comprising locating each wire of the main field winding within a scallop formed in the wire support.

19. A method as recited in claim 17, further comprising locating each wire of the main field winding below an end cap defined by the wire support.

20. A method as recited in claim 17, further comprising supporting the at least one wire on the arcuate wire receipt surface which defines a crown height dimension CH, the crown height dimension CH approximately two wire diameters of the wire.

* * * * *